Jan. 27, 1970   B. I. BERESNEV ET AL   3,492,009
DEVICE FOR PACKING GAPS, MAINLY IN HIGH PRESSURE APPARATUS
Filed May 17, 1967
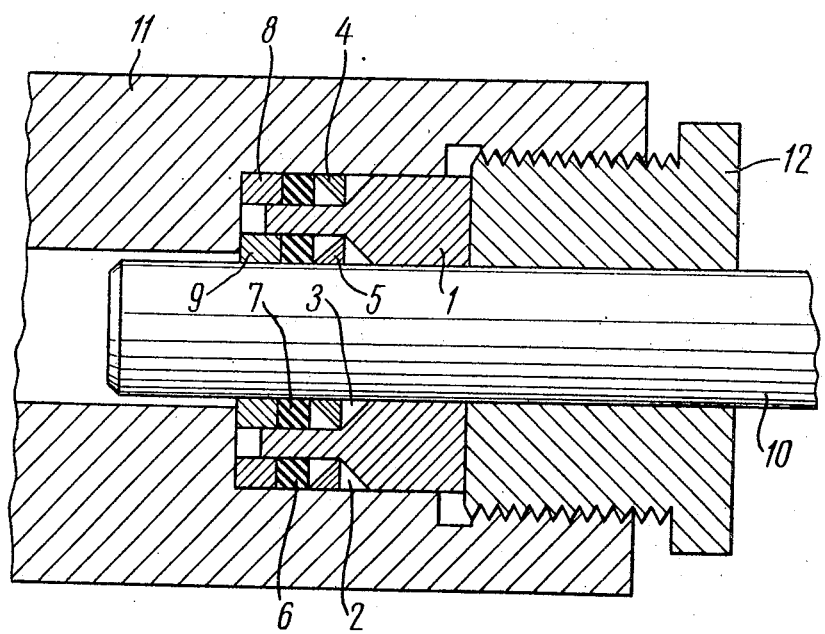

United States Patent Office 3,492,009
Patented Jan. 27, 1970

3,492,009
DEVICE FOR PACKING GAPS, MAINLY IN HIGH PRESSURE APPARATUS
Boris Ivanovich Beresnev, Ulitsa Krasnoprudnaya, 7/9, kv. 31; Evgeny Dmitrievich Martynov, MGU, Sektor L, kv. 13; and Leopold Davydovich Livshits, Gogolevsky bulvar, 23, kv. 25, all of Moscow, U.S.S.R.
Filed May 17, 1967, Sr. No. 639,103
Int. Cl. F16j 15/18, 15/00, 15/56
U.S. Cl. 277—112                    1 Claim

ABSTRACT OF THE DISCLOSURE

A device for packing gaps, mainly in high pressure apparatus comprises a bushing on one of whose end faces annular grooves are formed on the internal and external surfaces thereof, said annular grooves having surfaces narrowing in the direction of the gaps being packed, there being support rings, preliminary packing rings and main packing rings disposed in the grooves of said bushing, the main packing rings having a right triangular cross-section and contacting the surface of said grooves to move therealong under the action of pressure towards the gaps being packed.

---

The present invention relates to devices employed mainly in high pressure apparatus for packing movable parts thereof, such as plungers and piston rods in pressure intensifiers, pumps, and the like.

Known in the art are packing devices, preferably for high pressure apparatus, comprising rings adapted for preliminary and main packing, wherein rings for main packing, made as rectangular triangles in cross-section, move under the action of pressure along surfaces mutually approaching in the direction of gaps being packed.

A device of such type was described in "Review of Scientific Instruments," 28, No. 12 (1957), 1058.

These packing devices, disposed in the plunger grooves, move together with it and cause a rapid wear on the surfaces of the parts being packed, e.g. on the plunger and cylinder.

It is an object of the present invention to provide such a device for packing gaps, which would make it possible to pack gaps between respective parts without causing any wear on the surfaces of the parts being packed and which withstand a high pressure of the working medium.

In accordance with the above and other objects, the device of the present invention for packing gaps, preferably in high pressure apparatus, comprises rings intended for preliminary and main packing, wherein the rings for main packing, made as rectangular right triangles in cross-section, move under the action of pressure along surfaces mutually approaching in the direction of the gaps being packed, the device being provided with support rings and a bushing with annular grooves made on one of the end faces thereof on the internal and external surfaces of said end face, said annular grooves narrowing towards the gaps being packed, the main packing rings, rings for preliminary packing and support rings being disposed in said annular grooves of the bushing.

The device proposed hereinbelow may be effectively used in most diverse high pressure apparatus both under laboratory and industrial conditions.

The main advantages of the device of the invention for packing gaps are its high wear resistance and dependability, as well as its small overall dimensions.

Given below is a description of an exemplary embodiment of the present invention with due reference to the accompanying drawing, illustrating in section the packing device of the invention.

The proposed device for packing gaps comprises a bushing 1 on one of whose end faces on the external and internal surfaces thereof annular grooves 2 and 3 are formed, narrowing towards the gaps to be packed, this being ensured by their conical shape.

Disposed in the grooves 2 and 3 are rings 4 and 5 adapted for main packing, said rings being triangles in cross-section. These rings are located so that one of the sides of the ring, forming a right angle, faces the narrowing groove, while the other side faces the surface of the part being packed.

Also disposed in the grooves 2 and 3 are rings 6 and 7 for preliminary packing and support rings 8 and 9.

The bushing 1 with the main packing rings 4 and 5, preliminary packing rings 6 and 7 and support rings 8 and 9, disposed in the grooves 2 and 3 in the above-indicated order, is mounted on a plunger 10 and located in the stuffing box seat of a cylinder 11.

For tightening the packing, a nut 12 is employed.

The main packing rings 4 and 5 should be made of metal, featuring plastic properties, such as brass, bronze, mild hardened steel, and the like.

The support rings 8 and 9 should be made of metal, and the rings 6 and 7 for preliminary packing should be made of plastic, e.g. of Teflon, Capron, or soft metal, such as lead or aluminum.

The proposed packing device operates as follows.

During the working stroke of the plunger 10, the pressure of liquid in the cylinder 11 increases and via the preliminary packing rings 6 and 7 is transmitted to the main packing rings 4 and 5, whereby the rings 4 and 5 become compressed or squeezed on the conical surfaces of the annular grooves 2 and 3 of the bushing 1 and seal the gaps between the bushing 1 and the parts to be packed, viz., the plunger 10 and cylinder 11.

When the pressure in the cylinder 11 increases so as to exceed 600 kg./sq. cm., the packing action of the rings 6 and 7 ceases, and the pressure of the compressed liquid directly act on the rings 4 and 5, resulting in a further compression or squeezing of said rings. Between the rings 4 and 5 the parts 1, 10 and 11 being packed there arise contact strains which prevent leakage of the compressed medium, the greater the pressure acting on the packing rings, the greater said sealing contact strains, i.e. self-packing takes place.

The rings having been subjected to preliminary compression or squeezing by the maximum working pressure, the packing rings are tightened by means of the nut 12. Such tightening is prerequisite for eliminating gaps, formed due to the deformation of the rings 4 and 5. At subsequent loads the packing rings function similarly to the above-described manner, the only difference being in that the rings 4 and 5 are no longer subject to plastic deformation, but function as resilient bodies.

If the proposed packing device is to operate at temperatures above 300° C., the rings 6 and 7 should be made of heat-resistant materials, e.g. of silicones or graphitized asbestos.

The proposed device for packing gaps is intended for use in apparatus wherein the pressure reaches about 10,-000 kg./cm. and above.

In the description of the particular embodiment of the invention disclosed above specific narrow terminology has been resorted to for the sake of clarity. It should be understood, however, that the present invention is in no way limited by the terms so selected and that each such term covers all equivalent elements operating in a similar manner and employed for solving similar problems.

Though the present invention is described in connection with the preferred embodiment thereof, it should be understood, however, that various changes and modifications may be made without departing from the spirit and scope of the invention, as those skilled in the art will easily understand.

What is claimed is:

1. In combination: a cylinder having a bore therein with an enlarged seat at one end thereof, a displaceable plunger in said bore, and sealing means between said plunger and said cylinder, said sealing means comprising a bushing in said seat encircling said plunger and including a stem extending parallel to said plunger and in spaced relation therewith and with said cylinder to define first and second annular spaces in said seat on either side of said stem, said bushing having conical surfaces which join said stem with the remainder of the plunger and which narrow in the direction of the gap to be sealed which is formed between the plunger and the cylinder at said bore, first and second main packing rings on said stem on both sides thereof, said rings each having a right trinagular cross-section and cooperatively forming a rectangular section, the rings closest to said conical surfaces having hypotenuses facing away from said conical surfaces, one ring having a first base in contact with the cylinder and a second base facing one of said conical surfaces, the other ring having a first base in contact with the plunger and a second base facing the other of said conical surfaces, preliminary packing rings in said seat on both sides of said stem and in contact with a respective of said main packing rings, support rings in said seat in abutment between said cylinder and said preliminary packing rings, and a nut threadably engaged in said cylinder and in abutment with said plunger.

References Cited

UNITED STATES PATENTS

| 1,506,420 | 8/1924 | Flashpoehler et. al. | 277—106 |
| 1,725,836 | 8/1929 | Solberg. | |

FOREIGN PATENTS

| 372,490 | 3/1923 | Germany. |
| 254,816 | 7/1926 | Great Britain. |

LAVERNE D. GEIGER, Primary Examiner

J. S. MEDNICK, Assistant Examiner

U.S. Cl. X.R.

277—125, 188